R. W. HORNOR.
PROCESS OF AND APPARATUS FOR REMOVING WATER FROM OIL.
APPLICATION FILED DEC. 10, 1917.

1,284,343.

Patented Nov. 12, 1918.

INVENTOR
R. W. HORNOR

BY Fm. Wright,

ATT'Y.

UNITED STATES PATENT OFFICE.

RALPH W. HORNOR, OF BERKELEY, CALIFORNIA.

PROCESS OF AND APPARATUS FOR REMOVING WATER FROM OIL.

1,284,343.

Specification of Letters Patent. Patented Nov. 12, 1918.

Application filed December 10, 1917. Serial No. 206,413.

*To all whom it may concern:*

Be it known that I, RALPH W. HORNOR, a citizen of the United States, residing at Berkeley, in the county of Alameda and State of California, have invented new and useful Improvements in Processes of and Apparatus for Removing Water from Oil, of which the following is a specification.

The object of the present invention is to provide an apparatus for removing a liquid from a continually supplied mixture thereof with another liquid of different density.

My invention has been especially designed for the purpose of removing water from its mixture with oil as it comes from an oil well through a pipe line to a refinery or a storage tank, but it is also adapted for use with other mixtures.

Figure 1:
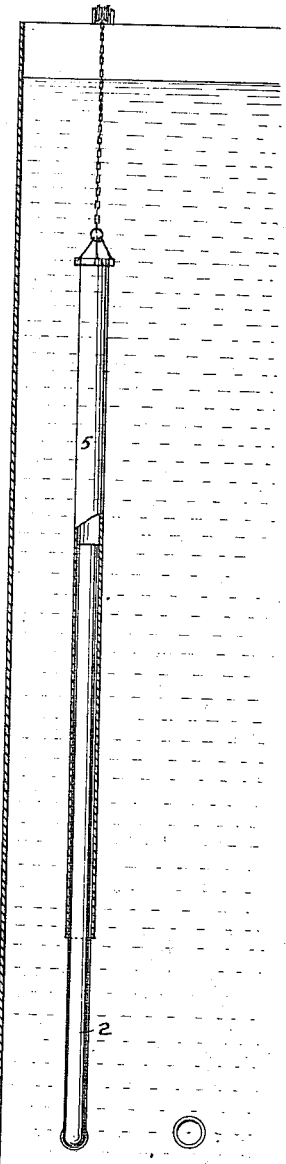
Figure 1:
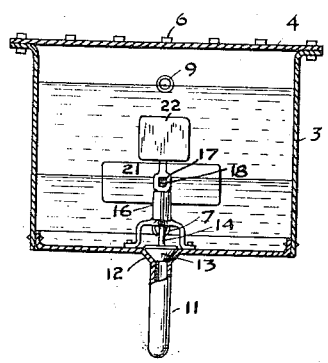
Figure 2:
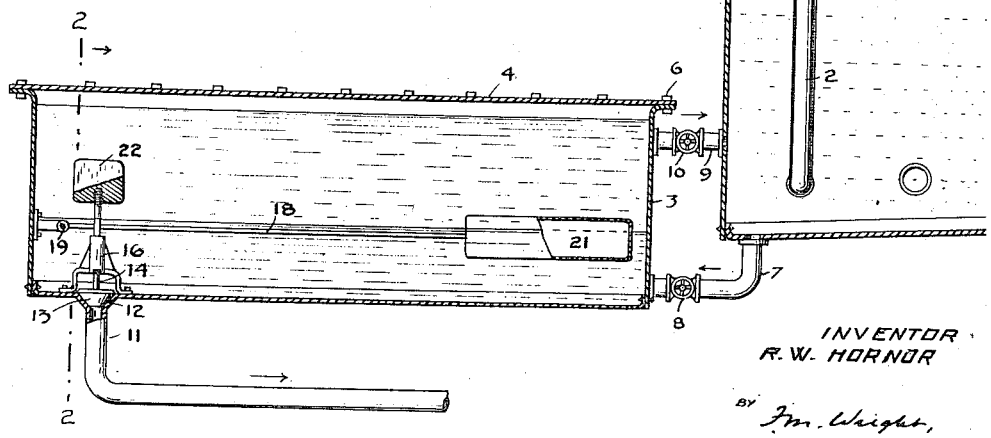

In the accompanying drawing, Figure 1 is a broken vertical section showing my improved apparatus applied for removing water from a tank to which a mixture of oil and water is continuously supplied; Fig. 2 is a cross-sectional view of the same on the line 2—2 of Fig. 1.

Referring to the drawing, 1 indicates a tank, a part only of which is here shown, into which, at a variable height, by means of a telescoping tube 5, a mixture of oil and water is delivered from a pipe line 2, leading from an oil well. After being delivered to the tank, the water settles from the oil on account of its greater density, and, consequently, there are in the tank two layers, one of oil and the other of water, the respective depths of which vary according to the proportion of oil and water in the mixture which comes from the well. Thus it is not uncommon to have 5 feet in depth of water in an oil tank of a depth of 30 feet.

At present it is the practice to employ men to visit the tanks periodically. These men draw off all the water from the tank, then close the draw-off pipe, and then proceed in like manner to the next tank. But, besides the great expense incurred by the employment of a considerable number of workmen, there is often considerable loss of oil due to the carelessness of the workman in omitting to close the outlet pipe when oil begins to flow therethrough instead of water, which omission happens not infrequently from the workman leaving his post while the liquid is still running. The loss of oil occasioned in this way amounts, in a year, to a very considerable sum.

By my invention the means by which the liquid escapes is automatically opened to discharge the water when the water lead has risen to any predetermined height desired and is automatically closed just before oil would begin to flow instead of water, so that, as a matter of fact, water separated from the oil is continuously flowing out of the tank as fast as it flows in mixed with oil.

To insure that the tank never contains anything but oil, except a small amount of water, mixed with oil, which has just been delivered to the tank and is sinking to the bottom, I use an auxiliary tank 3 having a cover 4 secured thereon by bolts 6, so as to be airtight, and to withstand a pressure equal to the weight of a column of water of the height of the liquid in the main tank. The bottom of this auxiliary tank 3 rests at a slightly lower level than that of the main tank and is connected therewith by a lower pipe 7 controlled by a valve 8 and leading from the bottom of the main tank, which bottom should, preferably, slightly slope downward to the inlet end of said pipe 7, also by a pipe 9, connecting the upper part of the auxiliary tank with the main tank at a higher level, and closed by a valve 10. A discharge pipe 11 leads from the bottom of the auxiliary tank and connects with said bottom through a valve seat 12 controlled by a conical valve 13, of which the stem 14 is guided vertically by a guide 16. Through a slot 17 in the upper part of said stem extends a float lever 18, fulcrumed on a shaft 19, mounted in bearings supported upon the adjacent end of the tank, the free end of said lever being secured to a float 21. A weight 22 is supported upon the top of the valve stem so as to hold said valve down to its seat independently of the float.

Both the valves 8 and 10 being open and the auxiliary tank freely communicating with the main tank, it is evident that the surface of demarcation between the water and oil in the auxiliary tank is at the same level as that in the main tank. If it is desired that all the water be drained out of the main tank, then this level will be either the same level as, or below, the bottom of the main tank.

The float will be of such weight that it will float in water but sink in oil, and, consequently, it will float at the bottom of the oil and at the top of the water, part of the float displacing water and part displacing oil, and the weight of the float being equal to the combined weights of the water and oil displaced. The float, of course, always follows the level of the water. The valve being on the same side of the fulcrum as the float, it is evident that the sinking of the float will cause the valve to be pressed to its seat, and the rise of the float will raise the valve from its seat. In so rising from its seat, the valve permits water to escape therethrough, and, in consequence, the level of the water and the float both fall, until the valve is again pressed to its seat, and no liquid can then escape.

In considering the problem of saving the above-mentioned waste in a refinery containing several hundred oil tanks, from which the water is at present separated by the methods heretofore described, it has been stated that the following conditions would have to be fulfilled by a device which would successfully displace the workmen:—

(1) The apparatus must be able to separate water from oil of any gravity and not heavier than 26°, Baumé.

(2) The depth of the water allowed to remain in the tank must not be greater than 4 or 5 inches.

(3) The apparatus must be so constructed that, in case of failure to operate or any accident thereto, the valve must close positively and remain closed.

(4) The apparatus must be of such a nature that the valve will not allow the escape of more than that well-known negligible percentage of oil which is permanently held by the water.

(5) The apparatus should be so arranged that in case of failure to operate for any reason it will be easily accessible.

It will be seen that the first of these conditions is fulfilled by reason of that fact that the force of the float, either upward or downward, is multiplied very greatly by the lever when acting on the valve to raise or lower it, and therefore a float which is intermediate in weight between the weights of an equal volume of water and of oil at 26° Baumé will be satisfactory for the purpose.

It is evident that the second condition is fulfilled, for the employment of an auxiliary tank enables the level of the water to be reduced to the bottom of the main tank, or even below said bottom, if desired. However, since the depth of the float need not be more than a few inches, this auxiliary tank can be dispensed with, if desired, and the float and lever can be placed in the main tank.

It is for the purpose of fulfilling the third condition that the weight 22 is employed. The lifting power of the float is made amply sufficient to raise this weight, and to also raise the valve in case of a rise of the level of the water. But, if the float should become inoperative for any reason, as by its breaking off from its lever, then, owing to the weight 22, the valve will close positively and remain closed.

It is evident that the fourth condition is fulfilled because no oil whatever can escape except that well-known small percentage which is always carried off by water which has been mixed with oil.

The removable top fulfils the fifth condition.

I desire it to be understood that I do not limit myself to the exact construction of the apparatus as herein shown, as numerous modifications of the apparatus, all embodying the same principle, can be devised without departing from the spirit of my invention.

I claim:—

1. In an apparatus for separating a liquid from a continuously supplied mixture thereof with a lighter liquid, a main storage tank into which the mixture is supplied, a separating tank, upper and lower parts of which communicate independently with respectively higher and lower parts of the storage tank and having an outlet, valves for controlling said communications and outlet, a pivoted lever, a short arm of which is operatively connected with said outlet valve to close or open the same, and a float operatively connected to a long arm of said valve to raise the same.

2. In an apparatus for separating a liquid from a continuously supplied mixture thereof with a lighter liquid, a main storage tank into which the mixture is supplied, a separating tank, upper and lower parts of which communicate independently with respectively higher and lower parts of the storage tank and having an outlet, the latter communication being below the level of the bottom of the main tank, valves for controlling said communications and outlet, a pivoted lever, a short arm of which is operatively connected with said outlet valve to close or open the same, and a float operatively connected to a long arm of said valve to raise the same.

RALPH W. HORNOR.